March 17, 1925.                                                                1,529,971
W. N. VANCE
SHEAR BLADE
Filed Sept. 22, 1919
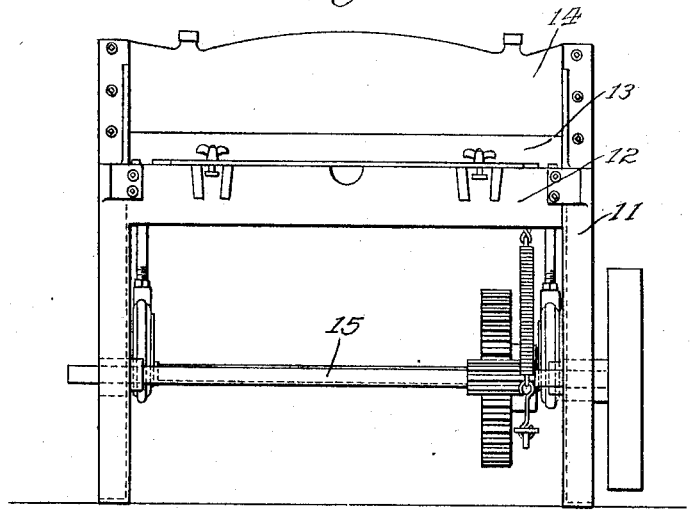
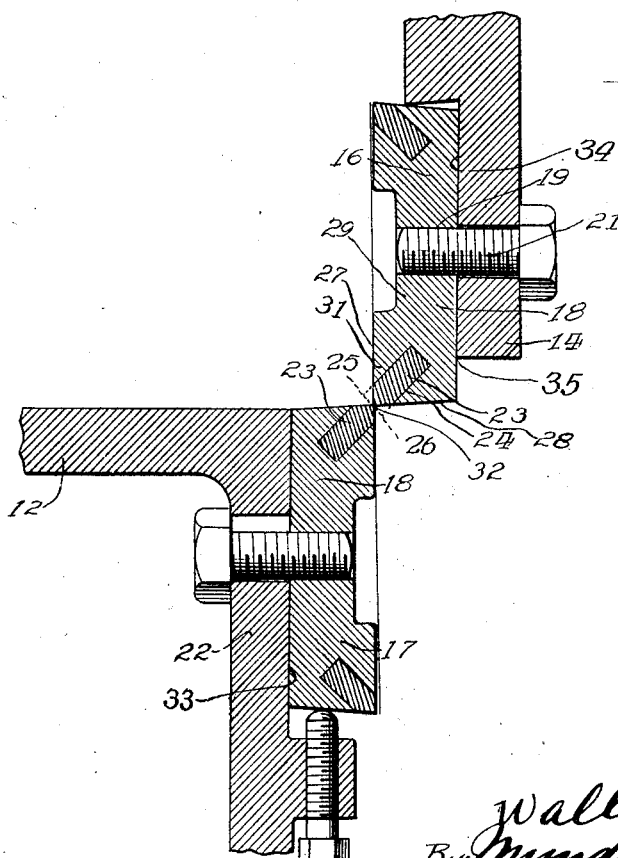
Inventor
Walter N. Vance
By Munday Clarke
 & Carpenter Attys Patented Mar. 17, 1925.

1,529,971

UNITED STATES PATENT OFFICE.

WALTER N. VANCE, OF CHICAGO HEIGHTS, ILLINOIS, ASSIGNOR TO DURAND STEEL LOCKER COMPANY, OF CHICAGO, ILLINOIS, A CORPORATION OF ILLINOIS.

SHEAR BLADE.

Application filed September 22, 1919. Serial No. 325,285.

*To all whom it may concern:*

Be it known that I, WALTER N. VANCE, a citizen of the United States, residing in Chicago Heights, in the county of Cook and State of Illinois, have invented a new and useful Improvement in Shear Blades, of which the following is a specification.

This invention relates in general to shears and has more particular reference to shear blades provided for the cutting of sheet metal, although it will be manifest as the invention is better understood that it has other valuable uses.

A principal object of the invention is the provision of a shear blade of novel and improved construction having a body of soft easily workable metal provided with a cutting edge part of tool steel. Prior to my invention it has been generally the custom to construct the entire blade of the material used at the cutting edge, or to weld the cutting material to a softer body part. The shear blades constructed entirely of the tool steel are expensive, extremely difficult to manufacture and are relatively short lived by reason of the character of the material. The welded blades are objectionable for the reason that the materials are difficult to weld and with them welding tends to undesirably affect the character of the material at the cutting edge part. Further difficulty and annoyance results from the fact that where welding is accomplished the welds are rarely of a secure and durable character. My present invention contemplates the provision of a shear blade having a body of softer metal in which an edge providing part or portion is permanently secured and this without requiring welding of the materials or the use of auxiliary fastening devices.

The invention has for a principal object the provision of a shear blade including a cutting edge portion set into a softer metal body so constructed and arranged as to permit both the edge portion and the body to retain permanently all of the beneficial results of treatment given them in accordance with the best heat cycles for their respective purposes.

Another and highly important object of the invention is the provision of a shear blade at greatly reduced cost and of strong and enduring character.

Another important object of the invention is the provision of a shear blade so constructed that two cutting edges may be provided together with a shear in which such a blade may be effectively used.

A still further object of the invention is the provision of a process for making such a blade.

Other objects and advantages of the invention will be apparent as it is better understood from the following description when considered in connection with the accompanying drawing illustrating a preferred embodiment thereof.

Referring to the drawings,

Figure 1 is a schematic front elevation of a shear for sheet metal; and

Fig. 2 is an enlarged partial vertical section through a pair of shear blades embodying my invention and incorporated in said machine, the section including the parts to which said blades are attached.

Considering first the schematic showing in Fig. 1 reference character 11 indicates a frame, 12 refers to the bed across which the sheets may be pushed to the shear, one of which is indicated at 13 and carried in a vertically reciprocating support 14, the support being driven from a power shaft 15 in a suitable or usual fashion. The machine may of course be of any desired width and is not infrequently of six, seven and even ten or twelve feet in cutting capacity, i. e., adapted to make cuts in sheets of such widths.

Two shear blades, exact duplicates of each other, embodying my invention, are shown on the drawing and indicated respectively at 16 and 17. Since these shear blades are duplicates in the present instance, although manifestly they may be differently constructed, a description of one of them will suffice for both. Each consists of an elongated back 18 of relatively soft, tough and workable metal having a suitable number of apertures 19 through it to take holding bolts 21 passing through the upper shear blade support 14 and through a flange 22 extending down from the rear edge of the bed 12. The blades shown on the drawing are provided with insets 23 of tool steel constructed and inserted as will now be described.

The material of the back is milled out inwardly from a long edge to provide a slot 24 of rectangular form, this slot preferably extending in about 45° to the horizontal and vertical.

The inset is of rectangular form and of such thickness as to prevent its insertion in the recess, except under quite a considerable pressure. The inset is inserted into the recess by pressure evenly applied, or sufficiently evenly applied to prevent breaking, along its outer face and is forced into permanent union by this pressure, being thereafter held in place in this union by a powerful friction created by the pressure. After the inset is in position the protruding corners 25 and 26 are ground off to the planes of the surfaces 27 and 28 of the backs or bodies, these being the surfaces that converge slightly toward the cutting edge. The surface 27 preferably extends up at a slight angle from the vertical and the surface 28 is exactly or nearly horizontal. This arrangement disposes the two insets 23 operatively arranged for cutting in such positions that when the cutting actions are completed they lie along the same general plane as may be seen by viewing Fig. 2.

The body of the back 29 is preferably thinner than the part 31 at the cutting location to provide a wide range for resharpening. When the shear blade is to be resharpened it is ground in both directions to or from the edge 32 across the back and the parts of the inset being ground extending throughout relatively narrow distances.

The inset 23 may be provided along two of the long edges of the blade as is shown on the drawing and either edge used in shearing. The two edges selected are preferably the two at one of the vertical faces of the blade when in position. In order that the cutting edges not in use may have substantial clearance in passing the line of shear of the blades actually in operation I give a slight incline to the surfaces against which the blades rest. That is to say, the forward face 33 of the flange 22 is caused to be at slightly less than 90° to the part 12 of the bed and the surface 34 back of the upper blade 18 is similarly inclined away from a vertical line passing through the lowermost point 35 of this surface.

Shears having either single or double cutting edges may be used with such a shear, as will be readily apparent. Manifestly either the single or the double blades may be used on shears of any suitable construction and may be substituted for blades of other character in use in shears without change in the construction of the shear other than the provision of the inclined backing surfaces where double blades are used. Such surfaces may be provided by cutting away the material of the bed and part 14 or by inserting a thin elongated wedge or tapered member between the blades and their backings.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for shearing sheet metal or the like, comprising a bed, a reciprocable element, and a shear blade attached to said reciprocable element, said blade comprising a backing member of relatively soft metal provided with corners and having a tool receiving slot at a corner thereof, and a tool steel inset adapted to be forced into said slot under pressure to provide a frictional securing bond, said inset providing a durable cutting edge for the blade at relatively low cost.

2. A machine for shearing sheet metal or the like, comprising a bed, a reciprocable element, and cooperating shear blades attached respectively to said bed and to said reciprocable element, each of said blades comprising a backing member of relatively soft metal provided with corners and having a tool receiving slot at a corner thereof, and a tool steel inset adapted to be forced into said slot under pressure to provide a frictional securing bond, said inset providing a durable cutting edge for the blade at relatively low cost.

3. A machine for shearing sheet metal or the like, comprising a bed, a reciprocable element, and a shear blade attached to said reciprocable element, said blade comprising a backing member of relatively soft metal provided with corners and having tool receiving slots at a plurality of its longitudinal corner portions and tool steel insets adapted to be forced into said slots under pressure to provide a frictional securing bond, said insets providing durable cutting edges for the blade at relatively low cost.

4. A machine for shearing sheet metal or the like, comprising a bed, a reciprocable element, and cooperating shear blades attached respectively to said bed and to said reciprocable element, each of said blades comprising a backing member of relatively soft metal provided with corners and having tool receiving slots at a plurality of its longitudinal corner portions and tool steel insets adapted to be forced into said slots under pressure to provide a frictional securing bond, said insets providing durable cutting edges for the blades at reatively low cost.

5. A shear blade, comprising a unitary soft metal back provided with plane faces or surfaces and edges having an elongated opening extending into it and along an angle midway the surfaces converging to the cutting edge, and a tool steel inset in said opening providing said cutting edge.

6. A shear blade, comprising a unitary soft metal back provided with plane faces or surfaces and edges, a tool steel inset inserted in a corner recess of said back, a similar inset and back in which it is mounted, said first-mentioned inset lying substantially along the plane in which the second-mentioned inset will be disposed when the cutting edges of said insets are cutting.

7. A shear blade, comprising a soft metal back provided with plane faces or surfaces and edges, and tool steel insets inserted along a plurality of its longitudinal corner edges and thereupon to provide cutting edges.

8. A shear blade, comprising a soft metal back provided with plane faces or surfaces and edges, and two tool steel insets inserted in longitudinal corner edges at opposite sides of a face of said back.

9. The process of making a shear blade, which consists in providing a soft metal back having corners and edges with a slot in a corner edge thereof for receiving a tool steel inset and forcing said inset into said slot under high pressure, and thereafter grinding it to the planes of the back surfaces.

10. The process of making a shear blade, which consists in providing a soft metal back having corners and edges with a rectangular slot extending in from a corner edge thereof, inserting into said slot a rectangular tool steel inset with a part extending beyond said back, and grinding away said part to provide an edge located at the edge formerly provided by the edge of the back.

11. A shear blade, comprising a soft metal back provided with corners and edges having a rectangular slot extending in from a corner thereof, a tool steel inset forced into said slot under high pressure and held in place by friction, said inset providing a cutting edge at the edge formerly provided by the edge of the back.

WALTER N. VANCE.